WILLIAM A. WALL, JR.
VAUGHN H. YOST
INVENTOR.(S)

ATTORNEYS

United States Patent Office 3,443,732
Patented May 13, 1969

3,443,732
APPARATUS FOR WELDING TORCH ANGLE AND SEAM TRACKING CONTROL
William A. Wall, Jr., and Vaughn H. Yost, Huntsville, Ala., assignors to the United States of America as represented by the Administrator of the National Aeronautics and Space Administration
Filed Aug. 7, 1967, Ser. No. 658,956
Int. Cl. B23k 3/00, 9/12
U.S. Cl. 228—7
21 Claims

ABSTRACT OF THE DISCLOSURE

Apparatus for automatically maintaining a welding torch at a desired angle to the work and at a constant welding speed using an electrical computer to make the necessary adjustments caused by the shape of the work surface based on the relationship of the carriage velocity, actuator arm velocity, and welding velocity.

Background of the invention

The invention described herein was made by employees of the United States Government and may be manufactured and used by or for the Government for governmental purposes without the payment of any royalties thereon or therefor.

This invention relates to apparatus for automatically tracking a seam in a work, and more particular for maintaining a welding torch at some predetermined angle and velocity to the work.

In the art of precision welding components of relative large articles such as, for example, tanks, ship hulls, etc., a track and carriage combination is commonly utilized. The track heretobefore, has generally been contoured to the shape of the article to be fabricated and has been placed parallel to the seam to be welded. The carriage, often referred to as the skate, supports a welding torch and other apparatus and is placed on the track so as to be movable thereon. The welding torch may be mounted on an actuated arm which is automatically adjusted to maintain the welding torch at the proper distance from the seam should it curve toward or away from the torch.

One method of keeping the carriage speed constant during the welding operation has been to spring load a rubber tired metal wheel against the surface of the material being welded. The rotary motion is used to generate a voltage known as the sensing voltage. This sensing voltage is then compared to a reference voltage which represents the desired welding speed. If the sensed and reference voltages are equal, a drive motor continues to operate the carriage at the same speed. If the sensed voltage is greater or less than the reference voltage, the drive motor is varied to correct the carriage speed. Other devices such as optical tachometers have also been used to cause the generation of a voltage which is proportional to the carriage speed.

With the introduction of large and awkward shape tanks in rocket construction, the prior art devices for welding through increasingly sharp and diverse angles of large structures have not proven to be satisfactory because of their reliance on mechanical sensors or probes and a welding head of limited movement.

Accordingly, it is an object of the present invention to provide a welding head with an inherent ability to maintain constant weld speed at the point of the arc without contour programming, jigs, templates, or tape control and without regard to the contour and surface finish of the work piece.

Another object is to provide a welding torch manipulator capable of maintaining a torch at a desired angle to the work.

These and further objects, uses, and advantages of the present invention will become apparent as the description proceeds.

Brief summary of the invention

The invention provides a welding head which will automatically rotate a torch about the point defined by the intersection of the arc and the work surface and an electrical control means which will maintain a constant weld or seam tracking velocity for the torch. The welding head includes a welding torch manipulator mounted on a proximity actuated arm. The arm is adapted to be carried by a carriage or skate along a track in such a manner that it remains perpendicular to the longitudinal direction of the track and positions the torch manipulator adjacent the seam of the work surface. The weld velocity which is represented by the tracking velocity of the arm relative to the work surface has a magnitude which is the resultant of the instantaneous carriage velocity and the actuator arm velocity. The mechanical relationship of the carriage and actuator arm fixes the carriage and actuator arm velocities at a right angle to each other. Thus the tracking velocity of the arm relative to the work surface forms a hypotenuse to the right angled carriage and actuator arm velocities.

A simple electrical control means is provided based upon the right triangle relationship of the carriage velocity, actuator arm velocity, and seam tracking velocity so as to maintain a substantially constant seam tracking velocity by varying the carriage velocitly. Also, this same control uses the unique relationship of the velocities to maintain the torch at a desired angle to the work. The torch manipulator has a combination of shafts and pivot members operated by a motor and synchro devices which are capable of maintaining the torch at a desired angle to the work surface in accordance with signals from the electrical control means.

This will be more readily understood by the following detailed description when taken together with the accompanying drawings.

Detailed description of the embodiment

Figure 1:
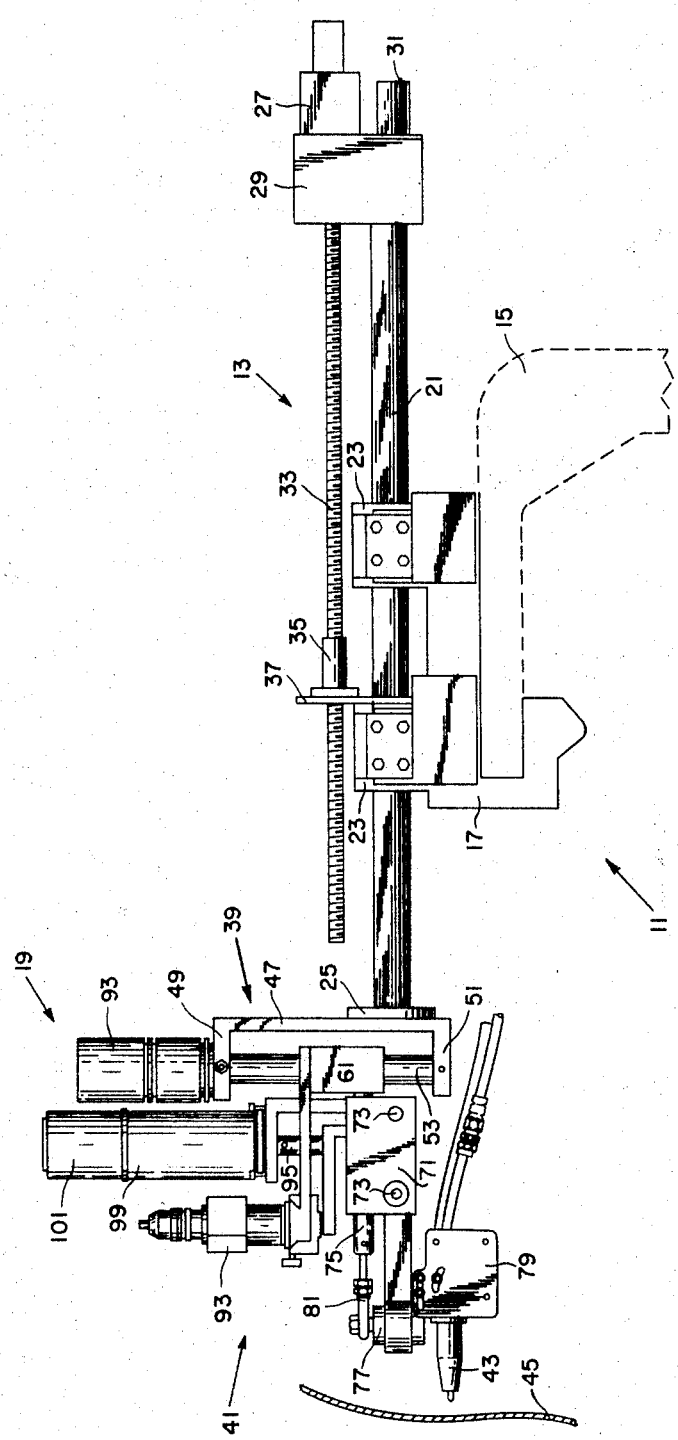
FIGURE 1 is a side view of the welding head apparatus.

The welding head 11 and its support apparatus is illustrated in FIG. 1. It comprises a conventional actuator arm 13 which is adapted to be mounted on a carriage or skate 15 which moves along a track adjacent the seam to be welded. The carriage 15 and its associated track are not disclosed since they may be of a type such as disclosed in U.S. Patent 3,229,883, which issued to V. H. Yost on Jan. 18, 1966. For reasons which will become apparent as the description proceeds, it is important that the actuator arm 13 to be so situated on the carriage 15 as to be perpendicular to the track. It is, therefore, necessary if the carriage moves on a curved track about the work, for the carriage to be designed to maintain the actuator arm perpendicular to the track when the track curves as well as when the track is straight. The carriage disclosed in U.S. Patent 3,229,883 accomplishes this purpose.

The actuator arm 13 has a supporting base 17 and carries the unique torch manipulator 19 of the present invention on the end thereof adjacent the joint to be welded. The arm 13 includes a slide bar 21 adapted to move back and forth through linear bearing assemblies 23 attached to the base 17. The forward end of the slide bar 21 supports a mounting plate 25 for the torch manipulator 19 and the back end of the slide bar 21 supports a servo motor 27 and gearing assembly 29 and a tachometer DC generator 31. The linear bearing assemblies 23 do not permit rotation of the slide bar 21 about its longitudinal axis.

The servo motor 27 and gearing assembly 29 drive an elongated screw 33 which acts through a nut assembly 35 fixed to an upstanding support 37. The upstanding support 37 is secured to the base 17 adjacent the forward linear bearing assembly 23 and has its center portion removed so as not to interfere with the action of the slide bar 21.

It is apparent that as the servo motor 27 drives the elongated screw 33 clockwise or counterclockwise it will by acting through the fixed nut assembly 35 cause the slide bar 21 to move either forward or backward in relationship to the base 17. The servo motor 27 is controlled by a conventional electrical system (not shown) for maintaining constant arc length by comparing the arc voltage with a reference voltage and feeding the difference into a servo amplifier. The tachometer generator 31 supplies the electrical analog of the velocity of the moving actuator arm 13 for a purpose which will be discussed hereinafter.

Figure 2:
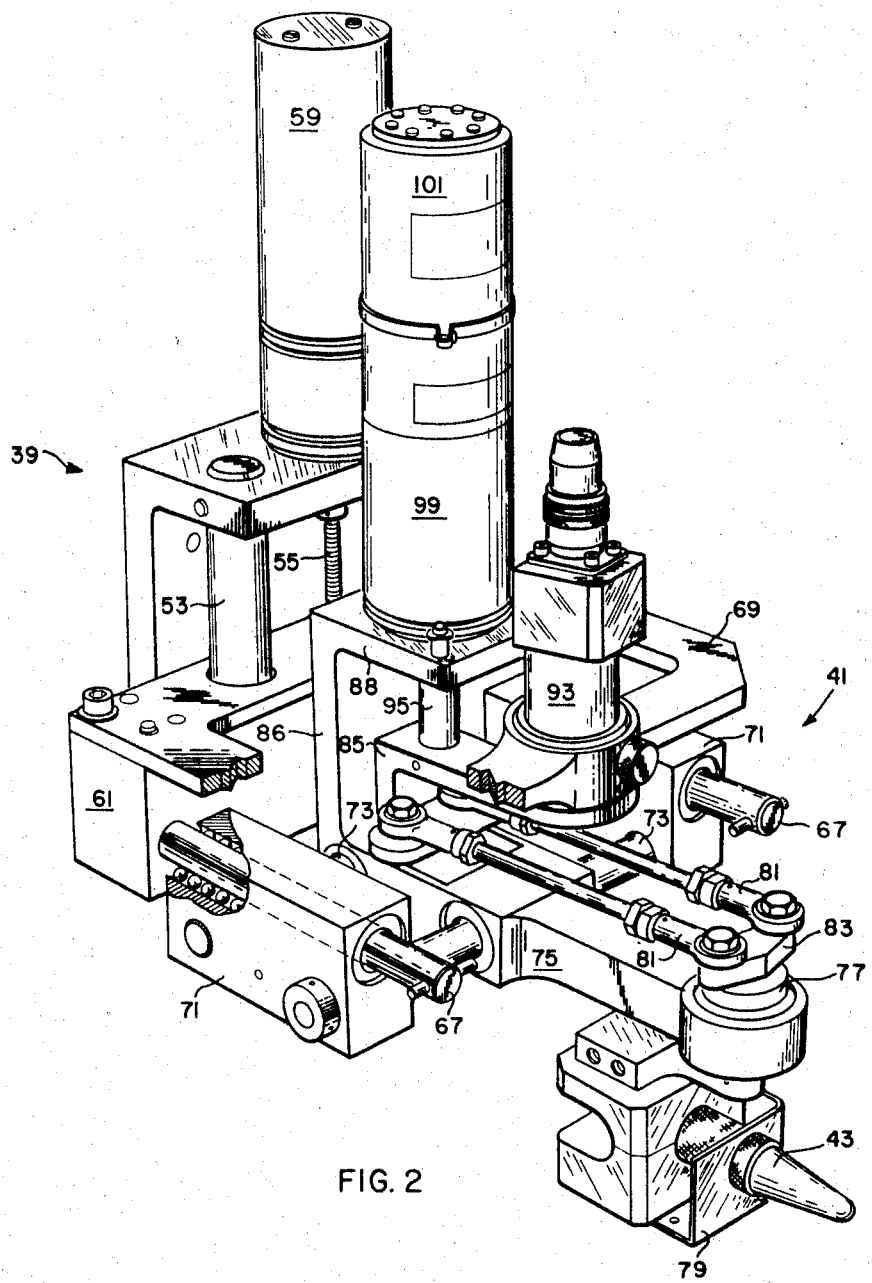
FIGURE 2 is a perspective of the torch manipulator of the welding head.
Figure 3:
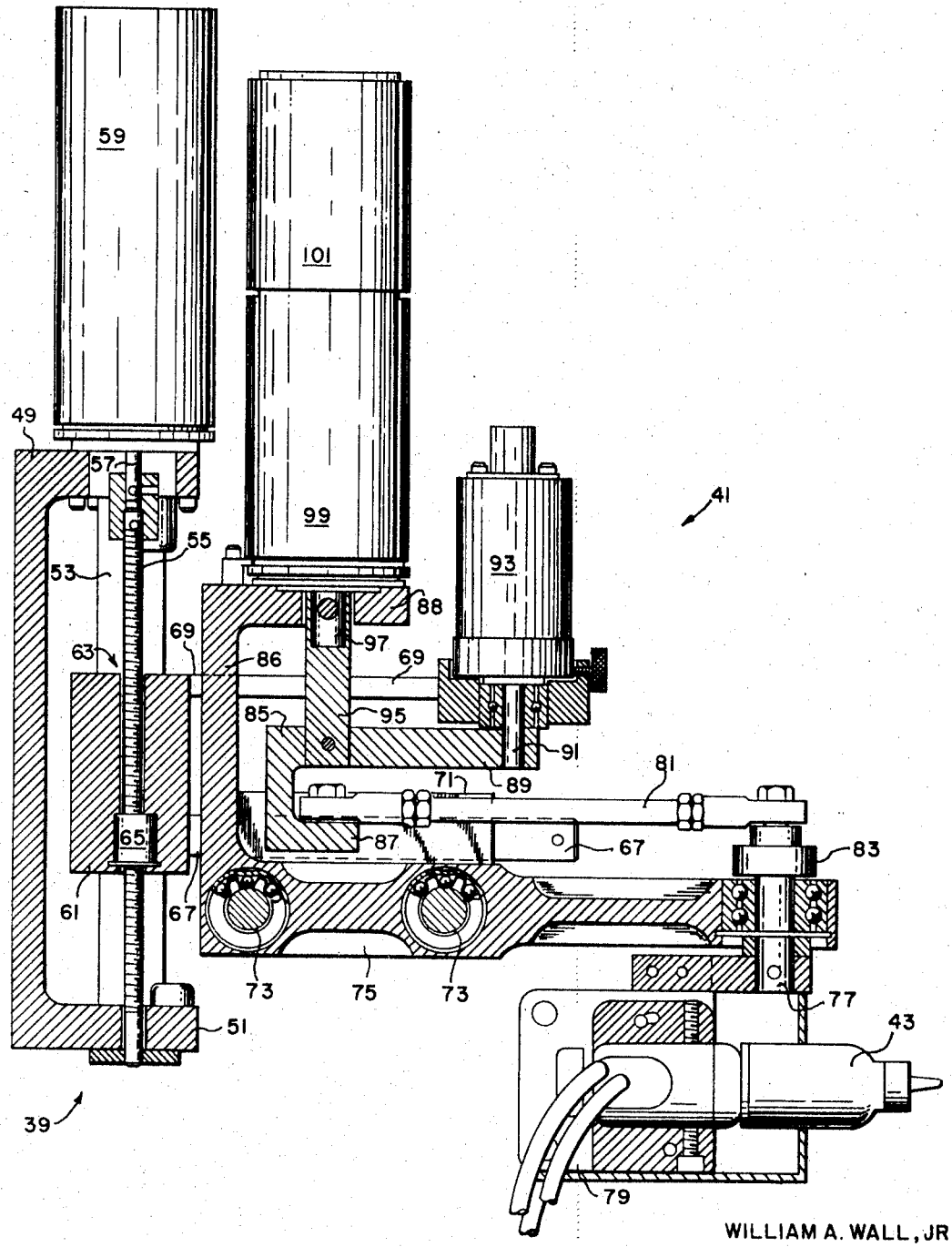
FIGURE 3 is a cross sectional view of the torch manipulator of FIGURE 2 with the cross seam adjustment mechanism removed.

Referring to FIGS. 1, 2, and 3 which illustrate the welding torch manipulator or holder 19 of the welding head. As shown best in FIG. 1, the torch holder 19 has a cross seam adjustment mechanism 39 attached to the forward end of the proximity actuator arm 13. The cross seam adjustment mechanism 39 supports a torch angle mechanism 41 which allows the torch 43 to manipulate and is specifically designed to rotate the torch 43 about the point where the welding arc intersects the work 45. It will be apparent to those skilled in the art that the major advantages of the present invention is that the bulk of the welding head 11 is remote from the work 45 and physical interference with the actual welding operation is minimized.

The cross seam adjustment mechanism is defined by a generally vertical main frame 47 having a top 49 and bottom 51 flange extending forwardly therefrom. The main frame 47 is secured to the mounting plate 25 of the actuator arm 13.

Two shafts 53 extend between the two flanges 49 and 51 of the main frame portion 47 for slidably mounting of the torch angle manipulator 41. An elongated screw 55, see FIGS. 2 and 3, extends mid-way between the two shafts 53 and is journaled at its lower end to the bottom flange 51 and is secured at its upper end to the shaft 57 of a servo motor 59 secured to the top flange 49.

As shown best in FIG. 3, the main body 61 of the torch angle mechanism 41 is slidably mounted on the two shafts 53 and has a bore 63 through which the elongated screw 55 extends. Inside the bore 63 of the mount is a nut 65 which the screw 55 acts through. Thus, the servo motor 59 may be energized to cause the main body 61 to adjust between the top and bottom flanges 49 and 51 and thus positioned the torch angle mechanism 41 at its most advantageous position.

As shown by FIGS. 1 and 2, the main body 61 of the mechanism 41 has two side shafts 67 extending forwardly therefrom and an upper forwardly extending annular portion 69. A side block 71 is slidably mounted on each shaft 67.

Perpendicular to the side shafts 67 are two cross shafts 73 which extend between and are joined to the side blocks 71. An elongated member 75 is slidably supported adjacent its rear by the two cross shafts 73. The forward end of the elongated member 75 has a short vertical shaft 77 journaled therein which supports at its lower end the torch mounting block 79. The shaft 77 is adapted for pivoted or rotatable movement by the action of two rods 81 which are pivotally joined to the ends of a short beam 83 secured to the upper portion of the vertical shaft 77. It can be seen that if one of rods 81 pull and the other pushes on the short beam 83, the torch mounting block 79 may be rotated to a desired angle. The rear of the rods 81 are pivotally connected to a crank arm 85 so as to push and pull causing rotation of the torch mounting block 79 in accordance with the pivoting movements of the crank arm 85. The elongated member 75 has at its rear a vertical portion 86 with an upper forwardly extending flange 88 which is substantially parallel over its lower portion.

The crank arm 85 is a channel-like member with a short lower flange 87 joined to the rear of the rods 81 and a rather long upper flange 89 pivoted to the middle of the forwardly extending annular portion 69 by being secured to the shaft 91 of a synchro transmitter 93 which is held and supported by the annular portion 69.

At the rear of the crank arm 85 and extending upwardly from its upper flange 89 is a shaft 95 which is connected to the shaft 97 of a gear head 99 driven by a servo motor 101. The gear head 99 and servo motor 101 combination are securely fastened to the upper flange 88 of the elongated member 75. The center axis of the shaft 95 is equidistance from the pivot points of the rods 81 and crank arm 85.

It can be seen that as the servo motor 101 attempts to rotate the crank arm shaft 95 that it causes a rotative force to be produced which will drive the elongated member 75 along the cross shafts 73. Also, the action of the elongated member 75 sliding on the cross shafts 73 will in turn apply the rotative force to the side blocks 71 along the forwardly extending shafts 67 and cause the blocks 71 to slide. Thus, rotation of the crank arm 85 in a clockwise direction will cause a clockwise rotation of the torch angle mechanism 41 about the pivot formed by the crank arm 85 and upper annular portion 69.

The elongated member 75 of course is always parallel to the forwardly extending shafts 67 even though the arrangement of perpendicular shafts 67 and 73 allows the member 75 to rotate about the pivot point formed by the shaft 91 of the synchro transmitter 93. The rotation of the elognated member 75 is, however, limited by the present shafts arrangement to an angle of approximately plus or minus forty degrees.

Since the crank arm 85 will pivot as the elongated member 75 slides on the shafts 67 and 73 in a rotative movement, the rods 81 will both push and pull the cross beam 83 causing the vertical follower shaft 77 to rotate. The rotation of the shaft 95 in a clockwise direction will, therefore, cause a clockwise rotation of the crank arm 85 which by the action of the rods 81 will cause a clockwise rotation of the short vertical follower shaft 77. As the torch mounting block 79 is orientated on the follower shaft 77 in the same manner as the crank arm 85 is orientated on the shaft 95, the centerlines of both the crank arm 85 and the mounting block 79 will always be coincident or parallel.

It is apparent, therefore, that the rotation of the crank arm 85 about the fixed position shaft 95, is transposed by the movement of the elongated body 75, the rods 81, and the shaft 77 to the mounting block 79. Thus, the radius of the curve traced by the crank arm 85 is the same as that traced by the mounting block 79. The torch 43 is situated on the centerline of the mounting block so as to radially point toward the center of curvature which is designed to correspond to the intersection of the torch arc and the work surface. The net effect is that the torch 43 rotates about the intersection of the arc and work surface at an angle which is equal to the angle the shaft 95 of the synchro transmitter 93 rotates when the crank arm 85 pivots.

Figure 4:
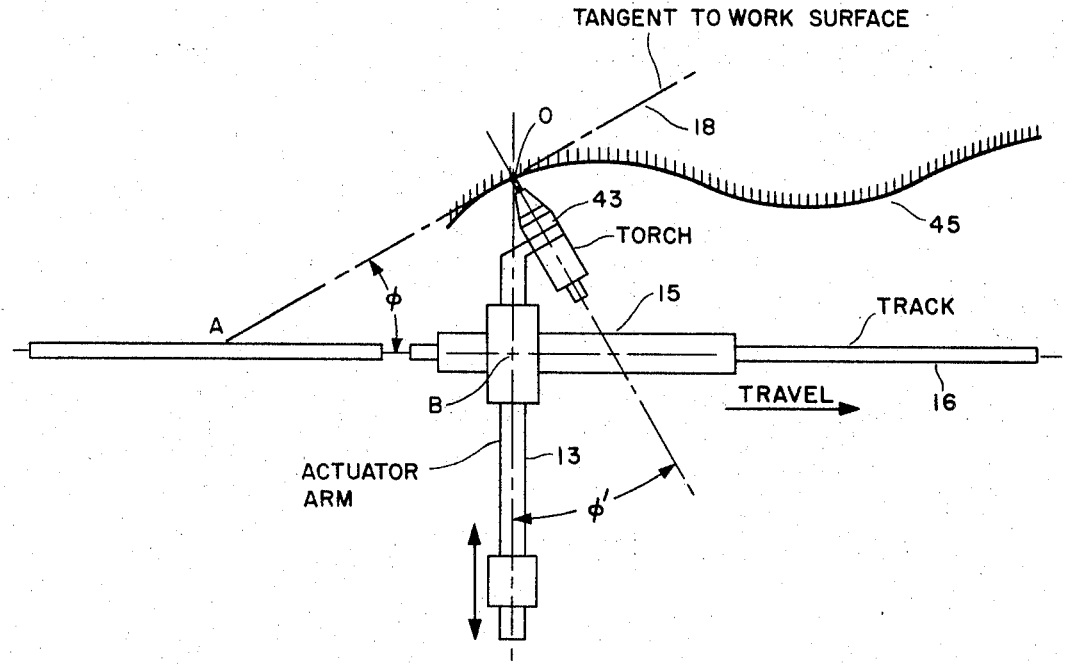
FIGURE 4 is a schematic illustrating the principle of operation of the apparatus shown in FIGURE 1.
Figure 5:
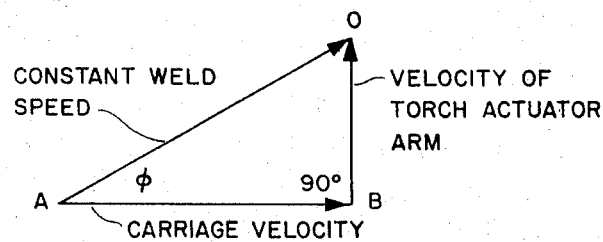
FIGURE 5 is a velocity diagram used in computing the desired angle between the torch and the work.

The operation of the welding head will be more fully understood by reference to the schematic shown in FIG. 4. Assuming that the carriage 15 is traveling on a straight track 16 and the torch 43 is arc welding a curved workpiece 45, it can be seen that the torch 43 will have a velocity vector toward the work surface due to the action of the actuator arm 13 as well as a carriage velocity vector parallel to the longitudinal direction of the track 16 due to the motion of the carriage 15. These velocity vectors, as illustrated in FIG. 5, form two sides of a right triangle. The welding velocity vector along the work surface forms the hypotenuse of the right triangle.

Because the torch 43 is electrically controlled to maintain proximity to the work surface by the action of the actuator arm 13, it is necessary to select carriage velocity vector AB as the variable to maintain the welding velocity vector AO constant. Therefore, the carriage velocity vector AB is obtained by multiplying the desired welding velocity vector by the cosine of the angle $\phi$. Since the equivalent electrical values for the velocity vectors AO and BO of the right triangle AOB are easily obtainable from the apparatus described, these two electrical values constitute adequate inputs for the instantaneous solution of the angle $\phi$.

Since it is usually desired to locate the torch 43 centerline so it will be nearly perpendicular to the work it was discovered that the angle $\phi$ can also be used to represent the desired angle $\phi'$ between the torch centerline and the actuator arm centerline by the law of similar triangles.

It should also be noted that the actuator arm 13, track 16, torch 43, and work 45 are related to each other in accordance with the planar schematic of FIG. 4, although some of the elements may be located on different elevational planes. The centerline of the actuator arm 13 should be in a first plane which is perpendicular to a tangent to the centerline of the track 16 at its intersection with the centerline of the arm 13. Also, this same first plane should pass through the point of intersection O formed by the centerline of the torch 43 and the work surface 45. A tangent line 18 to the work surface 45 at the point of intersection O and the centerline of the torch 43 lie in a second plane which is perpendicular to the first plane. The torch angle $\phi'$ lies in the second plane between the first plane and the centerline of the torch.

With these mechanical limitations in the apparatus a simplified solution of the problem of maintaining a constant welding speed and a suitable angle of the torch to the work can be obtained. It has been discovered that it is both feasible and practicable to compute the necessary velocities and torch angles to weld very complicated shapes without the need of special work angle sensing transducers and make the necessary adjustments to the apparatus in an instantaneous manner.

Figure 6:
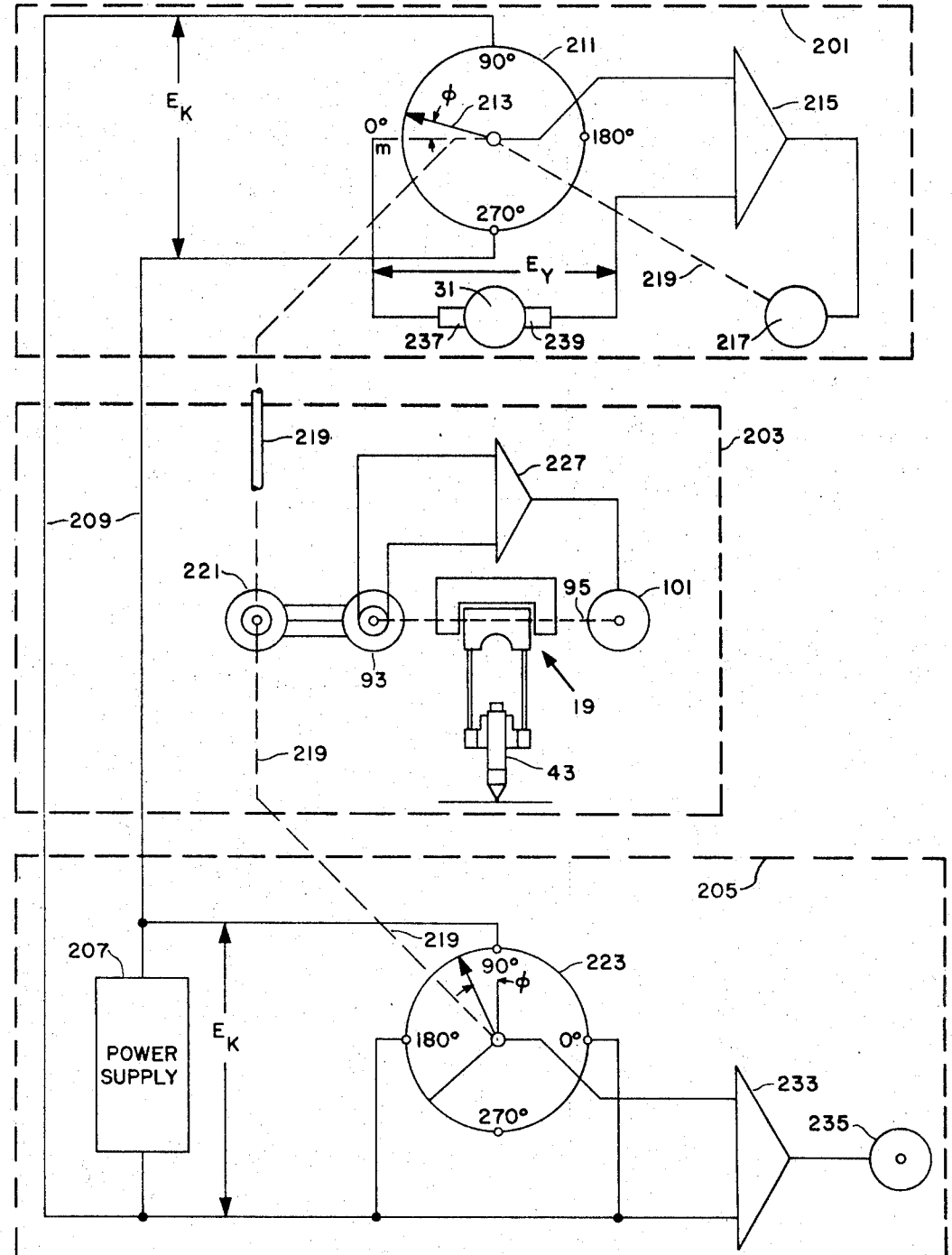
FIGURE 6 is an electrical schematic of the circuit used to operate the apparatus of FIGURE 1.

Electrically, the angle $\phi$ can be computed and the necessary signal given to the servo motor 101 of FIG. 2 by the control circuit which is shown in FIG. 6. The electrical circuit is composed of the angle $\phi$ computer subcircuit 201, the torch angle adjustment control subcircuit 203, and the carriage velocity control subcircuit 205.

Voltage $E_K$ of the power supply 207 which is shown in the carriage velocity control subcircuit 205 is selected to correspond with the desired electrical analog of the welding speed. The power supply voltage $E_K$ is fed by leads 209 across opposite terminals of a sine potentiometer 211 in the angle $\phi$ computer subcircuit 201 for comparison with the proximity actuator tachometer 31 analog voltage $E_Y$. This is the same tachometer 31 illustrated in FIG. 1 which generates a voltage proportional to the velocity of the movement of the actuator arm 13 to and from the work 45.

The output of the tachometer generator 31 is placed in series with the sine potentiometer wiper 211 to oppose the output of the potentiometer 213, and the differential output is fed into a servo amplifier 215.

The output of the servo amplifier 215 drives a servo motor 217 connected to the same shaft 219 as the wiper 213 so as to rotate the wiper to a voltage equal and opposite the tachometer generator voltage $E_Y$. Since the resistance of the sine potentiometer is distributed as the sine of the shaft angle, the resultant potentiometer shaft angle rotation from zero degrees is the desired angle $\phi$.

Also, connected to the shaft 219 of the sine potentiometer 211 is a synchro transmitter 221 and a cosine potentiometer 223. The synchro transmitter 221 is electrically connected to a synchro control transformer 93 previously discussed in reference to FIGS. 1, 2, and 3. In FIG. 6, the welding head manipulator is schematically illustrated in a simplified manner by showing of a shaft 95 which adjusts the torch 43. This shaft 95 corresponds in function to the vertical shaft 95 illustrated in FIG. 2.

The synchro transmitter 221 produces a difference voltage whose amplitude depends on the angular displacement in position of the crank arm shaft 95 and the computer control shaft 219. Whenever, the angle $\phi$ computer 201 senses a change and the computer shaft 219 is rotated by servo motor 217 the synchro transmitter 221 gives a signal.

The synchro transformer 93 produces a voltage whose amplitude depends on the angular displacement in position of the crank arm shaft 95 and the computer shaft 219 which operates the synchro transmitter 221. The voltage output of the synchro transformer 93 is amplified by a servo amplifier 227 which drives the servo motor 101 to cause a displacement of the crank arm shaft 95 until the two shafts 95 and 219 are the same angular position. Thus, the angle of the torch shaft 95 is also represented by the angle $\phi$.

The carriage drive speed correction subcircuit 205 has a cosine potentiometer 223, a servo amplifier 233, and a servo motor 235 serving as the carriage drive. As the computer shaft 219 is rotated, the cosine potentiometer 223 will electrically reduce the power supply voltage $E_K$, which is an analog of the desired welding or tracking velocity, by the cosine of the angle $\phi$ to obtain the desired electrical analog of the carriage speed which is fed into the servo amplifier 233 which drives the servo motor 235.

In operation, for example, as the actuator arm 13 moves toward the work piece 45 the tachometer generator 31 will cause a voltage to be fed to the servo motor 217 causing a rotation of the computer shaft 219. The rotation of the computer shaft 219 will cause the synchro transmitter 221 to signal a change in the torch angle adjustment shaft 95 and the cosine potentiometer 223 to change the carriage velocity.

The control circuit shown in FIG. 6 will discriminate between up-slope and down-slope of the work piece in order to correctly position the torch angle adjustment mechanism 19. The power supply voltage $E_K$ is fed into the 90 degree and 270 degree terminals of the sine potentiometer 211. The wiper 213 can be either positive or negative with respect to the 0 degree terminal.

If the tachometer voltage at terminal 237 is positive and at terminal 239 is negative, the wiper 213 must be positioned between 0 degree and 270 degrees to obtain equal and opposite voltage. If the tachometer voltage at terminal 237 is negative and at terminal 239 is positive, then wiper 213 must be positioned between 0 degree and 90 degrees to obtain equal and opposite voltage.

Since the voltage output of the tachometer generator 31 will have opposite polarity for each direction of movement of the actuator arm 13, the polarity of the tachometer 31 are used to discriminate between the up-slope and down-slope of the work 45 with respect to the carriage track.

It is believed apparent that an improved apparatus for supporting a welding head for automatic movement has been disclosed which enables the torch to maintain a desired angle to the work surface and a constant weld speed.

Obviously, many modifications and variations of the present invention are possible in light of the above teachings. It is, therefore, to be understood that within the scope of the appended claims the invention may be practiced other than as specifically described.

What is claimed is:

1. In an apparatus of the type including a motor driven carriage traveling a track near a work surface, the carriage supporting an actuator arm perpendicular to the longitudinal direction of the track, and the actuator arm being automatically adjustable to maintain a substantially constant distance between its end and the work surface, comprising:
   means for producing a first electrical analog of the actuator arm velocity toward and away from the work surface,
   reference means for producing a second electrical analog corresponding to the desired tracking velocity of the end of said arm relative to the work surface, and
   computer means utilizing inputs of said first and second electrical analogs to vary the velocity of said carriage so as to maintain a substantially constant tracking velocity approximately equal to said desired tracking velocity.

2. An apparatus according to claim 1 wherein said computer means includes:
   means for computing a first angle whose sine is the value of said first electrical analog divided by said second electrical analog, and
   means for driving said carriage at a velocity whose electrical analog corresponds to said second electrical analog multiplied by the cosine of said first angle.

3. An apparatus according to claim 2 wherein said means for determining the first angle, comprises:
   a computer shaft,
   a motor driving said computer shaft for rotative movement,
   a sine potentiometer having its wiper connected to said computer shaft,
   means for electrically connecting said second electrical analog to the input terminals of said sine potentiometer,
   means for applying said first electrical analog in series opposition to the electrical output of the sine potentiometer so as to produce a differential electrical output,
   means for driving said computer shaft motor with said differential output so said motor will rotate said wiper until said differential output is zero and whereby the rotation of said computer shaft from zero degrees is the first angle.

4. An apparatus according to claim 3 wherein said means for driving said carriage include:
   a cosine potentiometer having its wiper connected to said computer shaft,
   means for applying said second electrical analog to the input terminals of said cosine potentiometer,
   means for driving said carriage motor with the electrical output of said cosine potentiometer.

5. An apparatus according to claim 4 including:
   mechanism means on said actuating arm for manipulating a welding torch.

6. An apparatus according to claim 5 wherein:
   said computer means includes a torch control means which causes said mechanism to maintain a torch at a desired angles to the work surface.

7. An apparatus according to claim 1 including:
   mechanism means on said actuating arm for manipulating a welding torch.

8. An apparatus according to claim 7 wherein:
   said computer means includes a torch control means which causes said mechanism means to maintain a torch at a desired angle to the work surface.

9. In a tracking apparatus, a member adapted to track along a line in a work surface,
   means imparting to said member a first velocity toward or away from the work surface as the surface curves toward or away from the member as it tracks along the line,
   means imparting to said member a second velocity along the longitudinal direction of the line to be tracked,
   said first and second velocities being perpendicular to each other so that the actual tracking velocity of the member is related to said first and second velocities in the same manner as the hypotenuse of a right triangle is related to its sides.

10. A tracking apparatus according to claim 9 including:
    means for producing a first electrical analog of said first velocity,
    reference means for producing a second electrical analog corresponding to the described tracking velocity of the member along the line of the work surface,
    control means utilizing inputs of said first and second electrical analogs to vary said second velocity so as to maintain a substantially constant track velocity of the member along the line of the work surface.

11. A tracking apparatus according to claim 10 wherein:
    said member is a welding torch.

12. A tracking apparatus according to claim 11 including:
    mechanism for manipulating said torch, and
    said control means having a means for causing said mechanism to maintain said torch at a desired angle to the work.

13. A tracking apparatus according to claim 10 wherein said means imparting to said member a second velocity, includes:
    a mechanism for manipulating said member as it tracks a line in a work, and
    said control means also including means for causing said mechanism to maintain said member at a desired angle to the work.

14. A manipulator, comprising:
    a main frame member having a main axis,
    a movable member with two opposed ends along a center axis,
    a power means secured to said movable member adjacent one end, said power means having a drive shaft extending perpendicular to said center axis,
    a follower shaft journaled to said movable member adjacent its other end so as to be perpendicular to said center axis,
    a crank arm pivotally connected at one end to said main frame member along said main axis, and fixedly connected at its other end to said shaft of the power means,
    means for allowing said movable member to rotate about the pivot point between said crank arm and frame member while maintaining its center axis parallel or coincident with said main axis, and
    means connecting said crank arm and said follower shaft for rotating said follower shaft the same angle that the crank arm pivots about the pivot point between said crank arm and frame member.

14. A manipulator as defined by claim 14 wherein said means for allowing said movable member to rotate, comprise:
    a first shaft secured to said main frame member and extending parallel with said main axis,
    a block member slidably mounted on said first shaft for back and forth movement,
    a cross shaft extending from said block member and secured thereto so as to be perpendicular to said first shaft,
said movable member being slidably mounted on said cross shaft so as to slide back and forth and cause the block member to slide back and forth on said first shaft.

16. A manipulator as defined by claim 15 including:
a welding torch secured to said follower shaft.

17. A manipulator as defined by claim 14 including:
a welding torch secured to said follower shaft.

18. A manipulator as defined by claim 17 wherein said welding torch has a arc axis perpendicular to the center axis of said follower shaft.

19. A manipulator as defined by claim 14 including:
control means for operating said power means so as to obtain a desired rotation of said follow shaft.

20. A manipulator, comprising:
a body member,
two parallel shafts secured at one end to said body member and extending forwardly therefrom,
a block member slidably mounted on each of said shafts for back and forth movement,
a cross shaft extending between said block members and secured thereto so as to be perpendicular to said parallel shafts,
an elongated member extending between said block members and being slidably mounted on said cross shaft adjacent to its rear portion,
a vertical shaft journaled within the forward end of said elongated member,
said vertical shaft having a mounting member on its lower end and a cross beam on its upper end,
said elongated member having at its rear a substantially vertical portion supporting on a raised forwardly extending flange a motor with a shaft extending vertically downwardly,
said body member having a horizontal annular portion extending above said side blocks and elongated member,
said vertical portion of said elongated member extending upwardly through the opening formed by said annular portion,
a crank arm pivoted at its forward end to the middle of the forward portion of said horizontal annular portion of the body member,
the rear of said crank arm being joined to the downwardly extending shaft of said motor,
two parallel rods, each rod connected at its forward end to opposite sides of said cross beam of the vertical shaft and at its rear to the crank arm on opposite sides of and equidistance to the downwardly extending shaft of said motor,
whereby rotation of said motor shaft will cause said elongated member to rotate about the crank arm pivot to said annular portion and said crank arm to cause saids rods to push and pull on opposite sides of said cross beam to cause said vertical shaft to pivot together with its mounting means.

21. A manipulator as defined by claim 20 including:
a welding torch secured to said mounting member.

References Cited

UNITED STATES PATENTS 3,267,251    8/1966    Anderson            219—125
3,158,121    11/1964    Brems               228—7

RICHARD H. EANES, JR., *Primary Examiner.*

U.S. Cl. X.R.

219—125